Patented Dec. 25, 1951

2,579,610

UNITED STATES PATENT OFFICE 2,579,610

SURFACE PROTECTING MATERIALS AND METHODS OF MAKING THE SAME

Antonio S. Pitre, United States Navy, San Francisco, and John Rudolph Saroyan, Vallejo, Calif.

No Drawing. Application October 23, 1947, Serial No. 781,770

30 Claims. (Cl. 260—3.3)

(Granted under the act of March 3, 1883, as amended April 30, 1928; 370 O. G. 757)

The present application is a continuation in part of our co-pending application Ser. No. 496,656, filed July 29, 1943, now abandoned.

This invention relates to surface-protecting materials, that is materials for protecting surfaces against sea water and marine growths, materials for protecting surfaces exposed intermittently to sea water and air, materials for protecting surfaces exposed continuously to air, and to methods of making the same.

In general, it is an object of the invention to provide coatings which may be easily, readily and quickly made, the constituents of which are available and relatively inexpensive, and the spreading of which on surfaces may be accomplished rapidly, economically and efficiently, and to provide simple, inexpensive methods of manufacture of said coatings.

Another object of the invention is to provide a coating which during its entire wearing life is antifouling, i. e., prevents the permanent attachment of marine growths such as barnacles, etc., and to provide such a coating having a long wearing life when exposed to sea water.

Another object is to provide an antifouling coating which is substantially impervious to sea water.

Another object of the invention is to provide an antifouling coating which continuously exposes a toxic surface, which erodes away by dissolving and/or disintegrating under the frictional attack of relatively moving water at least as rapidly as surface toxicity is leached out whereby a continuously toxic surface is exposed; to provide such a coating in which the erosion and surface-leaching rates are so related that a fully toxic surface is constantly exposed but the coating is not, in general, worn away more rapidly than is necessary to maintain the toxicity; to provide such a coating having a surface-leaching rate sufficient under the conditions to give the required toxicity but low enough to necessitate such a low rate of erosion as to give the coating a substantially normal wearing life and one far longer than coatings heretofore, all of which latter have been eventually attacked by barnacles; and to provide such a continuously toxic coating which has a minimum erosion life of three to five years and one which erodes at less than a rate of one quarter of a millimeter per year.

Another object is to provide a general formula for an antifouling coating, the manufacture of which may be so controlled that various predetermined erosion rates of the coating can be obtained as may be required for the different leaching rates of various toxics; to provide such a coating having as one constituent a partially polymerized polymer, the degree of polymerization of which may be controlled at one or more steps in the making of the coating; and to provide a method of making the same in which a large excess of the catalyst may be used.

Another object is to provide antifouling coatings as above described which may be applied hot or cold; to provide such coatings which do not char when applied hot; to provide such hot coatings with a plasticizer which, in addition to performing its usual function, also reduces the viscosity of the coating when molten and gives it homogeneity before and after application with the result, after application, that no constituent of the coating moves to the surface and, hence, the toxicity of the surface remains unaltered; to provide such hot coatings with softening temperatures such that the coatings do not soften or run or change their antifouling properties when the coatings or the material on which they are spread are exposed to the summer sun.

Another object is to provide a method of making a cold-applied antifouling coating in which the precise toughening desired is obtained by introducing relatively small amounts of tougheners which are compounds of very large molecular size.

Another object is to provide a coating for a surface intermittently exposed to sea water and to air over periods of various lengths; and to provide such a coating which has durability, adhesion and surface protecting powers; and to provide such a coating for such a surface on the interior of a container, the properties of the coating being unaffected by the rapidity of the ingress and egress of the sea water.

Another object is to provide sea water conduits which do not support marine growth therein.

Another object is to provide a coating that is inert and impervious to moisture whether the surface to which this coating is applied is continuously exposed to water, intermittently exposed to water and air, or continuously exposed to air.

Another object is to provide a coating, said coating to act as a shield between an antifouling coating and the surface which is to be protected.

Other objects of the invention will in part be obvious and will in part appear hereinafter.

The invention accordingly comprises methods and articles of manufacture and substances possessing the features, properties, and relation of elements which will be exemplified in the methods, articles and substances hereinafter described, the scope of the application of which will be indicated in the claims.

The coatings of the present invention are all based on a certain fundamental constituent. The nature of this constituent is varied and the choice of the remaining constituents is guided by the intended purpose of the particular coating and the intended manner of its application. The coatings may then be categorized by reference to the manner of application and the purpose: hot melt antifouling, hot melt anti-corrosive or barrier, cold antifouling, and cold anti-corrosive or primer. Because the fundamental constituent of all the coatings would fall within the group of chemicals known as "plastics" the coatings are sometimes loosely referred to as hot plastic or cold plastic coatings.

Generally, all the coatings may be considered as composed of the following ingredients classified on a functional basis:

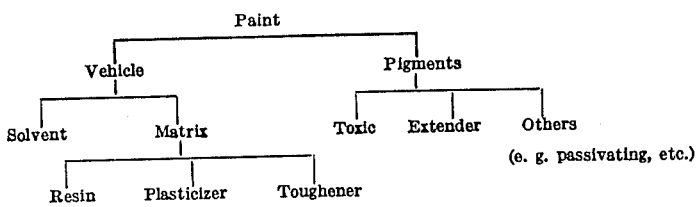

In hot melt coatings no solvent in the ordinary sense is used and therefore the vehicle becomes identical with the matrix and the two terms are synonymous. The choice of pigments is governed by the purpose for which the particular coating is designed. In antifouling paints the pigment is naturally largely composed of a toxic. In coatings used as anti-corrosives the pigment may include passivating agents. In other cases the pigment may be for coloring purposes only. Extenders, usually inert ingredients for adding body to the paint or for other purposes, may be included in various coatings. Each of the major categories of coatings with which this invention is concerned will be discussed separately.

ANTIFOULING COATINGS

Although numerous different theories have been proposed to explain the operation of antifouling coatings, reference to certain modern theories will suffice for an explanation of the operation of the antifouling coatings of this invention. It is believed that fouling by marine organisms is prevented by the presence at the coated surface of a solution which is poisonous to the organisms in the sense of somehow, perhaps in a manner as yet not fully understood, preventing their attachment to the surface. This pre-supposes that a toxic must be used in the coating which is soluble in sea water and which is so held in the binder or matrix of the coating that it can dissolve continuously for the desired life of the paint at a rate at least as great as the rate (hereinafter discussed) necessary to maintain antifouling conditions. According to certain theories this may be accomplished in several ways. The binder or matrix may be substantially insoluble in sea water but so heavily loaded with toxic that there is continuous contact between all the particles of the toxic. This type of insoluble matrix paint functions by permitting each particle to be exposed to the action of the sea water as soon as the one above it has been dissolved and removed. A second type of paint film which might require a lower loading of toxic would be one which is sufficiently permeable to sea water so that the sea water can penetrate the depths of the paint, dissolve the toxic and permit the dissolved toxic to diffuse to the surface for antifouling action. A third type of paint, that with which this invention is particularly concerned, is a coating in which the matrix is soluble in sea water and the action involves simultaneous loss of matrix and toxic.

A discussion and compilation of the cumulated developments in this field may be found in two articles entitled "Action of antifouling paints," one subtitled "Maintenance of the leaching rate of antifouling paints formulated with insoluble, impermeable matrices" appearing on pages 806–810 in volume 38, No. 8 of "Industrial and Engineering Chemistry," August 1946 and the other subtitled "Maintenance of leaching rate of antifouling paints formulated with soluble matrices" appearing on pages 931–936 in volume 38, No. 9 of "Industrial and Engineering Chemistry," September 1946.

The action of antifouling paints is thought to depend upon the maintenance at the surface of the coating of a solution of toxic in sufficient concentration to prevent the attachment of marine organisms for the period of life of the paint. This solution is maintained by substantially a continuous dissolution of toxic from the paint by the action of sea water. This action may be generally designated as leaching and the leaching rate is defined as the mass rate of liberation of toxic per unit area of the paint surface per unit time. The standard of comparison for antifouling coatings has been based upon the toxicity of copper and leaching rates are therefore conveniently compared to the leaching rate of metallic copper. It has been estimated that the average solution of 7 to 10 micrograms of copper per square centimeter per day is sufficient to prevent fouling growth. A method for testing the rate at which copper leaches from antifouling paints is described in an article entitled "Evaluation of antifouling paints by leaching rate determinations" on pages 456–460 of volume 37, No. 5 of "Industrial and Engineering Chemistry," May 1945. When compounds of copper, such as cuprous oxide are used, their leaching rate to maintain antifouling conditions must be such as to liberate the required minimum amount of copper and the leaching rate is thus reported in terms of, for example, micrograms of copper per square centimeter per day. When other toxics are used, their minimum leaching rates necessary to maintain antifouling conditions will be determined by their toxicity for marine fouling organisms relative to that of copper. For example, mercury has been found to be about five times as effective as copper in preventing fouling and should, therefore, be liberated at a rate of two micrograms per square centimeter per day in order to prevent fouling.

Heretofore attempts have been made to prepare antifouling coatings but they have been only partly successful in that these coatings have either been toxic for only a fraction of their wearing life or, on the other hand, their maximum wearing life has been too short. Certain earlier paints, for example, were constructed to be pervious to water. This permitted leaching out of the element toxic to marine growths. However, it also weakened the coating, on account of the action of the water throughout the body of the paint, with the result that the paint wore away frictionally or mechanically in a short period and even before the paint wore away the sea water reached and corroded the underlying metal. All antifouling paints that were not water-pervious were water impervious and generally hard, noneroding and brittle. Their toxicity lasted only while the toxic element on the original surface was being leached off, and they were so brittle that large percentages of the coating cracked, flaked and/or peeled off. This exfoliation was suggested in the patent to Coleman, No. 1,421,914, but it was found in practice that there was no control; the exfoliation was not uniform over a surface. In some places the paint inevitably peeled off down to the underlying metal with the immediate result that barnacles attached, and water and corrosion "crawled" under the surrounding areas, which were thereby presently doomed to complete loss of paint.

The antifouling coatings of the present invention, on the contrary, are toxic throughout their wearing lives and, not being brittle during exposure to salt water, they do not crack off; yet they are so tough that their life is at least one year for each 0.25 mm. depth of coating. Moreover, the coating may be built up to any desired depth.

The present coatings give surface leaching of the toxic. They are so constituted that they are not indestructible when subjected to the action of sea water but erode chemically and/or mechanically at a rate related to their surface leaching so that at no time does the surface leaching become less than is necessary to prevent fouling. In this fashion a surface of sufficient toxicity to prevent fouling is continuously exposed.

A resin constituent that allows just the desired rate of chemical and mechanical erosion is incorporated in the coating. An important feature of the invention is that the erosion-regulating property of the constituent not only can be controlled for any one particular toxic used, but may be varied to take into account the leaching rates of different toxics.

It is found that, although there must be some erosion to maintain the toxicity desired, the erosion rate is so slight that the coatings may last for years without substantially any fouling and without having to be renewed. The enormous savings and advantages of such coatings over the best coatings known heretofore (with lives from four to nine months) are immediately evident when there is considered the cost of dry-docking and removing barnacles and old paint, the cost of labor and material in applying a new coat, and the loss of operation of the ship during time in dry dock. Perhaps even more important are the loss of speed when a vessel's hull is covered with barnacles and the cost of extra fuel to bring the vessel up to its normal speed. To reach any given speed considerably more fuel must be expended when a ship is fouled. Also, fouling will frequency limit the maximum attainable speed to considerably below the designed maximum, regardless of how much fuel is expended.

Prior coatings have had for their relatively short toxic life a variable toxicity reaching a maximum in a short time. The coatings described herein have a substantially constant toxicity throughout their life. In general it is arranged that they erode only fast enough to give the necessary minimum toxicity to maintain antifouling.

When the present coatings have been exposed for a period to sea water a thick coat of slime accumulates on them of a heavier and more slimy nature than has been present on prior coatings. This thick slime contains a greater concentration of copper. It appears that the copper ion concentration is connected with the inability of the marine growths to harden their exuded attaching media so that they are unable to obtain a firm grip and are washed off by relative motion of the water.

The present antifouling coatings may be applied hot or cold. As hereinbefore indicated, in a hot melt coating the toxic-carrying medium, generally designated as the vehicle, is without any solvent in the ordinary sense and is constituted, in effect, by the molten matrix. If the coating is to be applied cold, the medium may include a solvent or thinner, in which case the vehicle may be said to comprise this solvent plus the matrix, or the vehicle may again be without any solvent in which case the cold matrix, necessarily in such instances of sufficient fluidity to admit of application by any preselected method, will constitute the vehicle. Such cold liquid matrix coatings dry or harden probably by polymerization and/or oxidation of the liquid matrix instead of by evaporation of a thinner or solvent. As was hereinbefore indicated the matrices in both the hot melt and cold coatings each comprise a certain fundamental constituent, a polymer or condensate, which may be identical in all coatings but which preferably contains the same ingredients in somewhat different proportions reacted under somewhat different conditions.

A review of the nature of antifouling paints and the functions of the various constituents, in the light of the preceding diagram, will be of assistance in understanding the present invention. Antifouling paints include a film forming phase in which pigments comprising toxics are dispersed or suspended. The constituents must be such as to form upon drying or hardening a film which is adhesive to the surface to be coated and is sufficiently flexible, cohesive, and durable as to resist undesirable mechanical destruction. Such a film may be described as amorphous, resinous, and having a certain amount of elasticity and plasticity. If its satisfactory operation as an antifouling coating is based upon the principle of disintegration by exfoliation and/or solution in sea water, its durability must, of course, be regulated to control the rate of disintegration. Certain constituents of antifouling paints may perform several functions in the same paint and may be used for different purposes in different paints. However, it will be convenient to designate a constituent by its primary function in the particular paint under consideration.

Since, upon drying, hardening, or solidification of the paint, the matrix ingredients must form the continuous coherent film or matrix in which the pigments are embedded, these ingredients must usually include a resin.

The matrix

*Resins.*—Both natural resins, such as rosin or shellac have been used as well as various treated natural resins and synthetic resins. The present invention contemplates the use of certain new synthetic resins or plastics prepared by reacting well known ingredients in a new manner and also such synthetic resins modified with rosin or other rosin-like film formers. Most natural resins are acidic in nature and this property is useful in antifouling paints in that it makes for solubility in sea water which is slightly alkaline.

*Plasticizers.*—A plasticizer is a material added to a paint to give a more flexible coating. In addition, a plasticizer may serve in hot melt paints as a fluidity promoting agent to facilitate the application of the molten coating.

*Tougheners.*—A toughener is a material added to a paint to increase the toughness and resistance to mechanical erosion of the paint film and thus contributes to the durability of the film. It may also serve to raise the softening temperature of a film and stabilize the film by promoting homogeneity and assisting in maintaining a colloidal suspension. Tougheners are compounds of very large molecular size such as vinyl resins, ethyl cellulose, chlorinated rubber, cyclized synthetic rubber and other synthetic polymers.

The solvent

The nature of the solvent used in cold applied paints is largely determined by the character of the matrix ingredients. Commonly used solvents are ketones, alcohols, coal tar naphtha, petroleum spirits, and turpentine.

The pigments

Pigments in antifouling paints provide the toxic properties necessary for antifouling action, give body to the coating and thus provide the desired thickness by controlling the spreading rate, and give strength and color to the coating. Inert pigments, commonly called extenders, are sometimes added to aid in suspending heavier pigments and prevent settling during storage.

HOT PLASTIC ANTIFOULING COATINGS

Analyzing the hot plastic antifouling coatings with which this invention is concerned with reference to the preceding diagram applicable to coatings generally and with reference to the immediately preceding description of the constituents of antifouling paints, "the resin" of the hot plastic antifouling coatings comprises what may itself be termed a resin but is perhaps better described as a partially polymerized polymer, i. e., a material which has not been completely polymerized but remains at an intermediate stage of polymerization. Since "the resin" of the coating may in itself be regarded as a resin, and since, in addition to the resin designated as a partially polymerized polymer, it may comprise rosin or a similar ingredient which may also be termed a resin, the partially polymerized polymer will, for the sake of clarity, hereinafter be designated as "the polymer" or, if appropriate, "the condensate," even though it may, itself, be a resin. The polymer is a condensation polymer of phenol or any of its homologues with an aldehyde and is therefore sometimes designated a phenoplast. The following phenols can be used advantageously:

Hydroxybenzene
Para substituted phenols such as—
    p-Tertiary amyl phenol
    p-Tertiary butyl phenol
Cresol The following aldehydes can be used advantageously:

Formaldehyde
Acetaldehyde
Benzaldehyde

The resin further comprises the main film forming material which may be:

Rosin
Abietic acid
Hydrogenated rosin (available commercially as "Staybelite")
"Petrex" acid (the synthetic resinous addition produce resulting from the reaction of maleic anhydride with monocyclic terpenes possessing the p-cymene skeleton, the chief constituent of which is 3-isopropyl-6-methyl-3,6-endoethylene $\Delta^4$ tetrahydrophthalic anhydride (see textbooks on plastics and resins, e. g. The Chemistry of Commercial Plastics by Wakeman published in 1947 by Reinhold Publishing Corp., New York))
Yacca gum This main film forming material is thus seen to be of a resinous nature and should be acidic to such an extent that it will dissolve in sea water which is slightly alkaline (ph about 8.1). Probably any acidic resinous film forming material can be used if it has a solubility in sea water of the order of magnitude of that of rosin, provided that it is compatible with the other constituents of the paint.

Plasticizers

The plasticizer, as hereinbefore suggested, performs two functions in hot melt coatings: it renders the final film flexible and it promotes fluidity or reduces viscosity of the molten paint. A large variety of plasticizers are available. Of these the following can be used advantageously:

Waxes or wax-like substances including—
    Animal and vegetable waxes such as beeswax and sugar cane wax
    Mineral waxes such as paraffin wax and ceresin
    Microcrystalline waxes
    Synthetic waxes such as terphenyl, hydrogenated waxes, and chlorinated waxes.
Fatty acids
Metallic soaps
Chemical plasticizers such as esters and sulfonamides
Natural plasticizers such as vegetable oils and pine oils

Tougheners

The toughener in a hot melt paint, in addition to performing its usual function of increasing the resistance of the paint film to the erosive action of sea water, may also perform certain other functions. It may desirably raise the melting point or softening point of the paint without undesirably increasing its viscosity. This will tend to prevent plastic flow of the paint on the side of a ship in drydock under a hot sun and similar deformation under the shearing action of water at high speeds. The following classes of substances, for example, can be advantageously used:

Addition elastomeric plastics such as vinyl chloride, vinyl acetate, polyvinyl butyral, and vinyl chloride-vinyl acetate copolymer.

Cellulosic plastics such as benzyl cellulose, ethyl cellulose, cellulose acetate proprionate, and cellulose acetate butyrate.

Rubber and rubber substitutes, and derivatives thereof such as natural rubber, chlorinated natural rubber, Buna S (a rubber-like copolymer of butadiene and styrene), cyclized rubber, and "Thiokol" (a rubber-like condensation polymer of an organic polyhalide and an alkali polysulfide).

Toxic

The toxic may be chosen from the available known substances which have been found useful for this purpose such as materials producing heavy metal ions including copper, copper compounds, such as cuprous oxide and Paris green, mercury compounds such as mercuric oxide, and organic toxics including DDT.

The examples below illustrate certain preferable compositions and their methods of manufacture in accordance with the present invention. Unless otherwise indicated, the term "parts" refers to parts by weight and the parts by weight of all constituents hereinafter refers to the hydrated or solution form of the constituents.

EXAMPLE 1

The polymer in this example will be designated as:

4A LIQUID PHENOLIC CONDENSATE

|  | Parts by Weight | Mols | Mol basis |
|---|---|---|---|
| Phenol (hydroxybenzene) | 290 | 3.08 | 1.25 |
| Lead acetate (hydrated) | 130 | 0.34 | 0.14 |
| Formaldehyde solution | 200 | 2.47 | 1 |

The lead acetate used is the normal technical grade known as sugar of lead and is hydrated as shown by the formula

$$Pb(C_2H_3O_2)_2 \cdot 3H_2O$$

The formaldehyde used in all the examples is a 37% by weight aqueous solution. The phenol and formaldehyde are reacted in the presence of lead acetate as a catalyst in any known manner such as by means of a continuous flow process somewhat similar to those described in U. S. Pats. Nos. 1,660,403, 1,473,347, and British Patent No. 230,861 (1925). Since the refluxing process is most common it is herewith described in detail. In the refluxing process the phenol, lead acetate, and formaldehyde solution may be placed in a varnish kettle with a reflux head. The kettle is heated slowly until the temperature reaches about 150° F. Thereafter, the heating is carefully controlled, in recognition of the exothermic nature of the reaction, to prevent excessively violent boiling as the temperature approaches 210° F.–212° F., the refluxing temperature range. Refluxing is continued until substantially all the formaldehyde has been combined. This point can be determined by noting that there is no appreciable formaldehyde odor remaining to the mixture or by applying the hydroxylamine hydrochloride test described in "A Laboratory Manual of Plastic and Synthetic Resins," by G. F. D'Alelio, published by John Wiley & Son. This latter test reveals a concentration of free formaldehyde of about 1/20 mol per liter at the desired point. Experience teaches that the time required to reach this point is usually about 45 minutes. A minute amount of the catalyst lead acetate would be enough to carry on the reaction. A relatively large amount, however, is used at this stage in order that it may be present as a buffer throughout the formation of the product. It is found to be relatively unsatisfactory to add the excess at a later stage in the method. The product made by this process is one preferable variant of the fundamental constituent appearing in all the coatings with which this invention is concerned. Another preferable variant, produced in the same manner, is designated and compounded as follows:

EXAMPLE 2

4B LIQUID PHENOLIC CONDENSATE

|  | Parts | Mols | Mol basis |
|---|---|---|---|
| Phenol (hydroxybenzene) | 290 | 3.08 | 1.25 |
| Lead acetate (hydrated) | 33 | 0.09 | 0.04 |
| Formaldehyde solution | 200 | 2.47 | 1 |

Mol ratio

Although the mol ratio of phenol to aldehyde in the preceding preferred compositions is 1¼ to 1, this ratio may be varied over a considerable range provided that it does not fall below unity in order to insure that the final coating produced will satisfactorily adhere to a surface and will fuse without charring at the temperatures of application. A mol ratio of as little as 0.7 produces a coating which undesirably chars on prolonged heating at the temperature of application. By way of illustration, choosing the 4B condensate of Example 2 and varying the amount of formaldehyde, while keeping the other ingredients constant, it is seen that the formaldehyde (anhydrous) may vary below the preferred proportion for the 4B condensate down to a ratio of 1.3 parts for every 10 parts of phenol and may be varied above the preferred proportion to a maximum of 3.2 parts for every 10 parts of phenol. Differently expressed, the mol ratio of phenol to formaldehyde may vary from 2.5 to 1 as indicated:

```
                                                Parts
Phenol _____ 60
Lead acetate (hydrated) _____ 6.75
Formaldehyde solution 20.6 (41.4 preferred)–51.7
```

Phenols

Different phenols also produce suitable polymers as indicated by the following examples which employ, purely for illustration purposes, a phenol to aldehyde ratio of unity. The method of reaction is substantially the same as that given for the preceding examples.

EXAMPLE 3

```
                                        Parts by weight
p-Tertiary amyl phenol _____ 164
Lead acetate (hydrated) _____ 60
Formaldehyde solution _____ 81
```

EXAMPLE 4

```
                                        Parts by weight
Hydroxybenzene _____ 47
Cresol _____ 54
Lead acetate (hydrated) _____ 13.5
Formaldehyde solution _____ 81
```

EXAMPLE 5

| | Parts by weight |
|---|---|
| p-Tertiary butyl phenol | 150 |
| Lead acetate (hydrated) | 60 |
| Formaldehyde solution | 81 |

Mixtures of phenols have also been found satisfactory. Thus the phenolic constituent can consist either of a single phenol or a mixture of phenols.

Aldehydes

Variations in the aldehyde used to prepare the polymer are illustrated in the following examples using, for illustration only, a phenol to aldehyde ratio of 1. The process is generally the same as for formaldehyde, but, of course, the reaction temperature will vary for each formulation.

EXAMPLE 6

| | Parts | Mols |
|---|---|---|
| Phenol | 94 | 1 |
| Lead acetate (hydrated) | 53 | 0.14 |
| Acetaldehyde | 44 | 1 |

EXAMPLE 7

| | Parts | Mols |
|---|---|---|
| Phenol | 94 | 1 |
| Lead acetate (hydrated) | 53 | 0.14 |
| Benzaldehyde | 106 | 1 |

Mixtures of aldehydes have also been found satisfactory. Thus the aldehyde constituent can consist of either a single aldehyde or a mixture of aldehydes.

The following is an example of a formulation using a mixture of phenols and a mixture of aldehydes.

EXAMPLE 7a

| | Parts |
|---|---|
| Hydroxybenzene | 47 |
| Cresol | 54 |
| Lead acetate (hydrated) | 60 |
| Formaldehyde solution | 41 |
| Benzaldehyde | 53 |

Catalysts

Using lead acetate as the catalyst its proportion may vary from 0.01 to 0.2 mol per mol of formaldehyde. For the preferred condensates the proportion per mol of formaldehyde is about 0.14 for the 4A condensate and about 0.04 for the 4B condensate. Variations in the catalyst used are illustrated in the following examples.

EXAMPLE 8

| | Parts | Mols |
|---|---|---|
| Phenol | 94 | 1 |
| Litharge | 4.5-20 | 0.02-0.09 |
| Formaldehyde solution | 81 | 1 |

EXAMPLE 9

| | Parts | Mols |
|---|---|---|
| Phenol | 94 | 1 |
| Cupric acetate (hydrated) | 4-18 | 0.02-0.09 |
| Formaldehyde solution | 81 | 1 |

EXAMPLE 10

| | Parts | Mols |
|---|---|---|
| Phenol | 94 | 1 |
| Lead salicylate | 4.8-28.9 | 0.01-0.06 |
| Formaldehyde solution | 81 | 1 |

The resin

To form "the resin," which will be the main ingredient of the matrix, the liquid phenolic condensate is blended with the main film-forming rosin-like substance. As hereinbefore indicated, this resinous film former or rosin-like substance may be rosin or certain other materials possessing similar properties. Two preferable varieties of resin are prepared from the condensates of Examples 1 and 2 as follows:

EXAMPLE 11

4A resin

| | Parts by weight |
|---|---|
| 4A liquid phenolic condensate | 128 |
| Rosin | 360 |

EXAMPLE 12

4B resin

| | Parts by weight |
|---|---|
| 4B liquid phenolic condensate | 108 |
| Rosin | 360 |

The liquid phenolic condensate and the rosin are mixed together. Either molten or solid rosin may be used. The mixture is agitated and the temperature is allowed to rise to from 275°–325° F. but preferably to about 300° F. Although this procedure is preferable and most convenient, it is possible to heat the condensate and rosin in separate containers and mix them when heated so long as the temperature of the condensate at no time exceeds that specified for the mixture. During this heating process it is believed that the phenol formaldehyde condensate is further partially polymerized by dehydration. As is well known in the art, whichever process is used, the heat is applied to the condensate at a uniform rate which is just slow enough to avoid excessive violent foaming. E. g., about 30 to 45 minutes are required to bring to 300° F. a mix of about 52 pounds of hot (about 212° F.) phenol formaldehyde condensate with about 174 pounds of hot (about 212° F.) rosin. The mixture is allowed to cool and after it has cooled it becomes a solid, thermoplastic resin. When this resin is a phenol (hydroxybenzene) formaldehyde product it has an acid number of about 130. A suspension is distilled water of a complete antifouling coating, hereinafter described, made with this resin exhibits a pH value of about 4 to 7 which fulfills the previously described necessity for an acidic nature of matrices for antifouling coatings of the soluble matrix type. Neither the aforementioned acid number nor the pH values are used as criteria in the production of the antifouling coatings of this invention but are merely observed characteristics of the respective products.

Prolonged heating, as observed, for example, incident to the reheating for application for as long as six hours of antifouling coatings embodying this resin does not fundamentally change the nature and suitability of the product, so long as the specified maximum temperatures are not exceeded.

Rosin may be replaced as a film former in the foregoing examples, weight for weight, either in part or entirely, by any one of Yacca gum
"Petrex" acid
Abietic acid
Hydrogenated rosin ("Staybelite") or
Rosin-phenol or mixtures of two or more thereof. The following example illustrates 4B type resins with various film formers.

EXAMPLE 13

| | Parts |
|---|---|
| Phenol | 60. |
| Lead acetate | 6.75 |
| Formaldehyde solution | 41.4 |
| Any one of yacca gum, "Petrex" acid, abietic acid, "Staybelite," rosin-phenol | 360 |

The next step toward the formation of a matrix is the mixing with the resin of a plasticizer, also known in the field of hot melt coatings as a flux for the reason that it serves to promote the fluidity of the molten mass. (For special purposes, as hereinafter explained, the resin alone may constitute the matrix.) The plasticizer and the resin are mixed together and the temperature is raised sufficiently to obtain homogeneity and a colloidal state. Preferably it is about 300° F. The materials used as plasticizers are chosen, as is obvious in the art, from the thousands of known plasticizers to be such as to be fluid at but not to decompose at the maximum temperature of preparation or application of the particular coating in which they are used.

To complete the formation of an antifouling coating a toxic must be added. It is usually advisable to sprinkle the toxic into the molten mixture of resin and plasticizer using agitation to bring about necessary wetting of the toxic. This in the case of cuprous oxide is most easily accomplished at temperatures of about 300° F. while lower temperatures are preferred with, for example, mercuric oxide which decomposes at elevated temperatures. Various satisfactory formulations using different film formers, plasticizers, toxics and fillers or extenders appear in the following examples.

EXAMPLE 14
[Paraffin wax melting point 117°–130° F.]

| | Parts |
|---|---|
| 4B resin | 163 |
| Paraffin wax | 99 |
| Cuprous oxide | 116 |
| Magnesium silicate | 30 |

EXAMPLE 15
[Paraffin waxes M. P. 132° F. to 195° F.]

| | Parts |
|---|---|
| 4B resin | 163 |
| Paraffin wax | 99 |
| Cuprous oxide | 177–750 |

EXAMPLE 16

| | Parts |
|---|---|
| 4B resin | 163 |
| Chlorinated naphthalene ("Halowax") | 18–99 |
| Cuprous oxide | 177–600 |

EXAMPLE 17

| | Parts |
|---|---|
| 4B resin | 163 |
| Any one of terphenyl ("Santowax"), sugar cane wax, beeswax, stearic acid | 18–99 |
| Cuprous oxide | 300–750 |

EXAMPLE 18

| | Parts |
|---|---|
| 4B resin | 163 |
| Any one of manganese linoleate, lead oleate, copper oleate | 18–70 |
| Cuprous oxide | 116–300 |

EXAMPLE 19

| | Parts |
|---|---|
| 4A resin | 163 |
| Toluene ethyl sulfonamide | 9–29 |
| Cuprous oxide | 116–177 |

EXAMPLE 20

| | Parts |
|---|---|
| 4A resin | 163 |
| Tung oil | 43 |
| Cuprous oxide | 99 |
| Paris green | 34 |
| Mercuric oxide | 34 |

EXAMPLE 21

| | Parts |
|---|---|
| 4A resin | 163 |
| Paraffin (M. P. 117° F–130° F.) | 99 |
| Cuprous oxide | 99 |
| Paris green | 34 |
| Mercuric oxide | 34 |

In compositions such as those of Examples 19 and 20 using mercuric oxide, a preferable procedure is to melt the resin and paraffin together raising the temperature to about 300° F. Then, maintaining the temperature at about 300° F., the cuprous oxide and Paris green are sprinkled in and the mixture is agitated to insure good dispersion. The heat is then removed and the temperature allowed to fall to about 280° F. at which time the mercuric oxide is sprinkled into the mix and the agitation is continued until a uniform product results. If desired, this product, while still liquid, can be run through a colloid mill to further insure good dispersion of the pigments.

Several plasticizing materials may be used in a single formulation in order to gain the particular advantages of each. For example, paraffin wax tends to insure low viscosity or high fluidity during application of a molten coating whereas metallic soaps such as manganese linoleate are particularly valuable in insuring plasticity in the applied dried film. The following formulations are illustrative.

EXAMPLE 22

| | Parts |
|---|---|
| 4B resin | 163 |
| Paraffin (117° F.–130° F.) | 40–85 |
| Manganese linoleate | 59–14 |
| Cuprous oxide | 116–177 |

EXAMPLE 23

| | Parts |
|---|---|
| 4B resin | 163 |
| Parafin (117° F.–130° F.) | 49.5 |
| Copper palmitate | 17.5 |
| Cuprous oxide | 116 |

EXAMPLE 24

| | Parts |
|---|---|
| 4B resin | 163 |
| Paraffin (117° F.–130° F.) | 49.5 |
| Lead oleate | 20 |
| Cuprous oxide | 116 |

EXAMPLE 25

| | Parts |
|---|---|
| 4B resin | 163 |
| Paraffin (117° F.–130° F.) | 90–50 |
| Stearic acid | 9–49 |
| Cuprous oxide | 116 |
| Magnesium silicate | 30 |

EXAMPLE 26

| | Parts |
|---|---|
| Yacca gum base 4B type resin (Ex. 13) | 163 |
| Tricresylphosphate | 103 |
| Cuprous oxide | 177 |

EXAMPLE 27

| | Parts |
|---|---|
| "Petrex" acid base 4B type resin (Ex. 13) | 163 |
| Terphenyl ("Santowax") | 99 |
| Cuprous oxide | 177 |

EXAMPLE 28

| | Parts |
|---|---|
| Rosin-phenol base 4B type resin (Ex. 13) | 163 |
| Oleic acid | 16 |
| Cuprous oxide | 177 |

EXAMPLE 29

| | Parts |
|---|---|
| 4B type resin based on any one of rosin, "Staybelite," abietic acid | 163 |
| Paraffin (M. P. 117° F.–195° F.) | 99 |
| Cuprous oxide | 177–750 |

*Tougheners*

Tougheners, chosen, of course, to be of the type which will not decompose at elevated temperatures of manufacture or application of the coatings may be added to hot plastic compositions, although, as indicated by the preceding examples, tougheners are not essential to the production of satisfactory coatings. In addition to accomplishing their primary function, tougheners are believed also to improve the permanence of the suspension or colloidal state of the hot plastic coatings. Preferably, but not necessarily, the toughener is usually blended with the resin prior to the addition of the plasticizer. If a liquid plasticizer is used it may be convenient first to dissolve the toughener in the plasticizer by heating and later to blend this solution with the resin. Examples of the formulations including such tougheners follow.

EXAMPLE 30

| | Parts |
|---|---|
| 4B resin | 163 |
| Paraffin (117° F.–130° F.) | 75 |
| Terphenyl ("Santowax") | 24 |
| Benzyl cellulose or ethyl cellulose | 2–4 |
| Cuprous oxide | 116–177 |
| Magnesium silicate | 30 |

EXAMPLE 31

| | Parts |
|---|---|
| 4A resin | 163 |
| Paraffin (117°–130° F.) | 38 |
| Beeswax | 30 |
| Ethyl cellulose | 30 |
| Cuprous oxide | 99 |
| Paris green | 34 |
| Mercuric oxide | 34 |

EXAMPLE 32

| | Parts |
|---|---|
| 4B resin | 163 |
| Paraffin (117° F.–130° F.) | 99 |
| Beeswax | 30 |
| Ethyl cellulose | 30 |
| Cuprous oxide | 177 |

EXAMPLE 33

| | Parts |
|---|---|
| 4B resin | 163 |
| Paraffin (117° F.–130° F.) | 75 |
| Terphenyl ("Santowax") | 24 |
| Polyvinyl butyral or polyvinyl acetate | 2–14 |
| Cuprous oxide | 177–300 |

EXAMPLE 34

| | Parts |
|---|---|
| 4B resin | 163 |
| Beeswax | 24 |
| Vinyl chloride-vinyl acetate copolymer | 2–14 |
| Cuprous oxide | 177–300 |

Satisfactory antifouling compositions may be made without the use of tougheners as hereinbefore indicated and as further exemplified by:

EXAMPLE 35

| | Parts |
|---|---|
| 4B resin | 163 |
| Paraffin (M. P. 117°–130° F.) | 99 |
| Cuprous oxide | 116 |
| Paris green | 34 |

EXAMPLE 36

| | Parts |
|---|---|
| 4B resin | 163 |
| Paraffin (M. P. 117°–130° F.) | 99 |
| Cuprous oxide | 177 |

Also, satisfactory antifouling compositions may be made in which the matrix consists of the resin alone as in the following example, suitable for special processes of application such as dipping.

EXAMPLE 37

| | Parts |
|---|---|
| 4B resin | 163 |
| Cuprous oxide | 116 |
| Magnesium silicate | 30 |

The hot melt antifouling coatings may be applied to a hull at once or may be allowed to cool to be applied at any later time after they have again been heated to the fluidity necessary for the proposed method of application. These hot coatings attain the fluidity required for spray application at about 300° F. They are normally applied as a spray under pressure in thickness of ½ to ¾ mm. In thicknesses of ½ mm. these coatings are antifouling for at least two seasons. A season in northern waters runs from about April to about October and in Southern Hemisphere waters from October to April. Normally two seasons is considered as extending for eighteen months.

*Summary of hot plastic antifouling coatings*

A summary of the constituents and methods of preparation of the hot antifouling coatings with which this invention is concerned are presented herewith. The coatings comprise a polymer or condensate made by reacting a phenol or mixture of phenols with an aldehyde or mixture of aldehydes in the presence of a catalyst which also operates as a buffer in the pH range of 3.6 to 6, the ratio of the phenol constituent to the aldehyde being at least unity. The desired group of polymers or condensates are made by refluxing until the aldehyde odor disappears phenol (hydroxybenzene) and formaldehyde in the presence of lead acetate as a catalyst with the mol ratio of phenol to formaldehyde ranging from 1 to 2½ and the lead acetate ranging from 0.01 to 0.2 for each mol of formaldehyde.

Preferred examples of the desired group employ:

1. 4B condensate—1¼ mols phenol, 1 mol formaldehyde, about 0.04 mol lead acetate and
2. 4A condensate—1¼ mols phenol, 1 mol formaldehyde, about 0.14 mol lead acetate.

The polymer or condensate is combined with a film forming ingredient to produce a resin. The desired group of resins is made by blending one part of polymer or condensate with 1.5 to 7 parts of film former. A preferred resin (4B resin) results from blending 1 part of 4B condensate with 3⅓ parts rosin. A second preferred resin (4A resin) results from blending 1 part of 4A condensate with 2.81 parts of rosin.

To form a matrix, 100 parts of resin are blended with from 5 to 70 parts of plasticizer, which may be one or a mixture of different plasticizing materials. A preferred matrix consists of 163 parts of 4B resin to 99 parts paraffin. Although tougheners are not essential to the preparation of satisfactory matrices, a preferred group of such matrices may be formed wherein the toughener varies from 0.5% to 13% of the matrix.

Antifouling properties for the aforedescribed matrices may be secured by adding a toxic, preferably in the proportion of from 0.4 to 3 parts of toxic for each part of matrix, thus completing the hot plastic antifouling coating. A preferred coating is obtained by adding to the aforedescribed preferred matrix, cuprous oxide in the proportion of about 0.44 part for each part of matrix.

COLD ANTIFOULING COATINGS

A coating that may be applied at atmospheric temperature is called a cold coating. The coatings next described are applied in cold solution and this requires that the partial polymerization of the polymer be carried to a different degree, in general, from that present in the hot thermoplastic coating. The preferred embodiments of the cold coating may include the same constituents as those of the hot coatings but the method of preparation varies somewhat as indicated in the following examples.

EXAMPLE 38.—POLYMER KNOWN AS PHENOLIC CONDENSATE # 2[1]

|  | Parts by Weight | Mol basis |
| --- | --- | --- |
| Phenol | 281 | 0.94 |
| Lead acetate (hydrated) | 169 | 0.14 |
| Formaldehyde solution | 258 | 1 |

[1] (Hereinafter designated as Phenolic #2)

The phenol, lead acetate, and formaldehyde solution are reacted by any of the methods mentioned in connection with the hot antifouling coatings but preferably as hereinafter described. The reaction may be conveniently carried out in a varnish kettle with a removable reflux condenser head. The ingredients are placed in the kettle, heat is applied at a moderate rate and when the temperature reaches about 200° F. the heat is reduced to a minimum since the exothermic nature of the reaction will continue to raise the temperature of the mix until the refluxing temperature is reached which is in the neighborhood of 210° F.-212° F. Refluxing is continued to the point at which no objectionable formaldehyde odor remains when the hydroxylamine hydrochloride test previously described will indicate a concentration not exceeding about 1/20 mol of formaldehyde per liter. This will usually take about 45 minutes when pound equivalents are used of the parts mentioned in the preceding formulation but it may be noted that varying the size of the batch does not appreciably vary the time required. It may further be noted that when the objectionable formaldehyde odor has disappeared the pH of the mixture is about 4, but the pH measurement is not generally used as an indication, the odor test being the one usually relied upon. The reflux head is now removed and heating is continued with agitation to produce dehydration. This heating is continued until the temperature preferably reaches about 220° F.-225° F. but does not exceed 225° F. and will usually require about 30 minutes. If the phenolic condensate product is to be stored, the heat is removed immediately upon reaching the desired temperature and the product is allowed to cool. The resulting liquid phenolic condensate is a preferred variant of the fundamental constituent from which the cold coatings of the present invention are made. The highest temperature which the condensate attains determines its characteristics in the final product. As hereinafter indicated, suitable variants of the final product may be produced with the highest temperature of the condensate ranging up to 300° F.

Another preferred embodiment, prepared in a manner similar to that of Example 38 is the following.

EXAMPLE 39.—PHENOLIC #2A

|  | Parts | Mols |
| --- | --- | --- |
| Phenol | 281 | 0.94 |
| Lead acetate (hydrated) | 42 | 0.04 |
| Formaldehyde solution | 258 | 1 |

Mol ratio

Preferably the mol ratio of phenol to formaldehyde is at least about 1, that is, for example, say from 0.9 to 1 but may be from 0.5 to 2.

Phenols

As explained in reference to hot plastic antifouling coatings, numerous other phenols may be used to replace hydroxybenzene either totally or in part. In the process of Example 38 cresol has been satisfactorily substituted for phenol mol for mol producing a polymer or condensation product having a pH of 3.85. Paratertiary amyl phenol has also been satisfactorily substituted mol for mol for the hydroxybenzene in Example 38.

Aldehydes

As explained in reference to hot plastic antifouling coatings, various aldehydes may be substituted either totally or in part for the formaldehyde in Example 38. Mol for mol substitutions for formaldehyde of benzaldehyde and acetaldehyde have been satisfactorily made in the formulation of Example 38.

The catalyst

The lead acetate used as a catalyst may vary from 0.01 mol to 0.2 mol per mol of formaldehyde. In practice, however, for the preferred condensates, Phenolic #2 and Phenolic #2A, about 0.14 mol and 0.04 mol, respectively, of lead acetate are used since this amount allows the reaction to be completed to the desired point in a relatively short time of about 45 minutes. Certain other catalysts have been found satisfactory in the proportions indicated for each mol of formaldehyde, in formulations using, for illustration purposes only, hydroxybenzene and formaldehyde, these having a mol ratio of unity.

|  | Mols |
| --- | --- |
| Lead salicylate | 0.01–0.06 |
| Cupric acetate | 0.02–0.09 |
| Litharge | 0.02–0.09 |

The catalyst must facilitate the reaction of phenol and formaldehyde in a controlled manner so that it does not proceed too rapidly and reach an infusible state. The catalyst should act as a buffer operating in the pH range of about 3.6 to about 6.

After the production of the polymer or phenolic condensate, the next step toward the preparation of a cold antifouling coating may differ, for convenience, from the analogous procedure used in the preparation of hot melt antifouling coatings.

instead of storing the resin as a distinct product, it is used immediately upon its completion in the preparation of a product designated as an intermediate which is more suitable for storage and subsequent handling. Preferred examples follow:

EXAMPLE 40
PHENOLIC INTERMEDIATE #143

|  | Parts | Composition |
|---|---|---|
| Phenolic #2 | 300 | 246 pounds. |
| Rosin | 600 | 492 pounds. |
| Coal tar naphtha or Petroleum xylol | 180 | 20.5 gallons. |

To produce a resin the phenolic condensate #2 and the rosin are blended together. This procedure may be accomplished by heating the ingredients separately or together with the provision that the condensate is never allowed to reach a temperature exceeding 300° F. Obviously, in order to obtain a satisfactory blend the rosin must be molten during the blending process. Since rosin melts at about 212° F. this means that if the process chosen is the heating of the ingredients together, the blending temperature will range from this melting temperature, about 212° F., to the upper limit of 300° F. Of course, it is possible to add the rosin to the phenol formaldehyde polymer immediately upon completion of refluxing and then heat the polymer-rosin mixture to dehydrate the polymer to any desired temperature within the allowable range or it is possible to add the rosin immediately upon completion of the process, aforedescribed, of dehydrating the polymer to 225° F. This would preclude the necessity of making and storing the phenolic condensate #2 or the like as a separate product. The method preferred in the factory for economy of heat energy is to combine molten rosin with the condensate, the condensate being at room temperature. The criterion for the temperature of the molten rosin in this preferred factory process is that the entire batch shall remain molten during the mixing process in order to insure that all of the rosin is properly blended. With factory batches involving 400 or 500 pounds of rosin it has been found that a temperature of about 240° F. for the rosin is satisfactory to keep it molten during the mixing process. For smaller batches involving about 10 pounds of rosin, a temperature of about 275° F. has been found suitable. In the preferred factory process the two constituents are mixed with agitation and slowly enough to avoid excessive bubbling and boiling. As soon as the mixing is complete the resin is ready to be thinned with sufficient coal tar naphtha or petroleum xylol to keep the product in a liquid state at room temperature. However, because of the relatively low boiling point of the solvent, it is advisable to allow the resin to cool down to about 180° F. before adding the solvent in order to avoid excessive loss thereof by evaporation. At this temperature the resin is still sufficiently molten to facilitate easy thinning with the solvent. If it is desired to hasten the operation, the outside of the kettle in which the process is carried out may be cooled with a sprinkler system to bring the resin down to the proper temperature for thinning.

When substituting in this process various condensates for phenolic condensate #2, it should be noted that although satisfactory coatings can be made using condensates having a phenol to formaldehyde ratio approaching as little as 0.7 with ultimate temperatures in the neighborhood of the upper limit of the range (300° F.), provided that the condensate is not held at this high temperature for over thirty minutes, it is, nevertheless, more desirable to control the production of coatings containing such low ratio condensates so that a maximum temperature of 275° F. for the condensate is never exceeded during the processing.

If phenolic #2A is substituted for phenolic #2 in Example 40, another preferred intermediate is produced designated as phenolic intermediate #143A.

By varying the proportion of rosin from 1 to 15 parts for each 3 parts of condensate, keeping the temperature of course within the specified limits, a family of resins can be produced having a consistency varying from liquid to solid. A family of intermediates may be produced by adding sufficient solvent to the members of the family of resins to facilitate application by any particular method. The amount of solvent required with each of these variants will vary, in general, inversely with the proportion of condensate since the condensate is itself a liquid and serves, as does the solvent, to facilitate application of the coating. The amount of solvent may be zero, in which case the resin and intermediate are identical. For example, with a ratio of 3 parts of condensate #2 to 1 part of rosin, a coating suitable for brush application results to which no solvent need be added. Certain others of these variants, made with zero solvent, which are nonliquid at room temperature and hence would normally require solvents to render them easily applicable by brush or spray as conventional cold coatings, constitute semi-solid hybrids suitable for application neither as a true cold coating nor as a true hot melt coating but by special methods such as trowelling or wiping. The hardening of such hybrids is accomplished by a drying process similar to that of conventional cold paints and not by solidification from a molten state as in the case of true hot melt types. These hybrids are applied by warming rather than by heating to elevated temperatures as in the case of true hot melt paints.

*Film formers*

Substitutes for rosin as a film forming ingredient which have been found successful in the cold antifouling coatings with which this invention is concerned are identical with those described for use in the hot antifouling coating viz.:

Hydrogenated rosin ("Staybelite")
Abietic acid
"Petrex" acid
Yacca gum
Rosin-phenol Each of these or mixtures thereof may replace the rosin either wholly or in part. The film former must be characterized by having a solubility in sea water of the order of magnitude of that of rosin. Since the solubility in sea water of the matrix of the final coating is influenced by the solubility of the film former, variations in the proportion of the toxic to maintain antifouling conditions must be instituted accordingly.

To complete the production of a cold antifouling paint there must be added to the intermediate a toxic, and, in general, the usual plasticizers and tougheners. The following formulation constitutes an excellent cold antifouling plastic paint:

EXAMPLE 41
(143 E)

| | Parts |
|---|---|
| Phenolic Intermediate #143 | 540 |
| Cuprous oxide | 360 |
| Tricresylphosphate | 60 |
| Chlorinated rubber | 8 |
| Coal tar naphtha or petroleum xylol | 32 |

To facilitate blending, the toughener, chlorinated rubber, is preferably first dissolved in the coal tar naphtha or petroleum xylol and the tricresylphosphate plasticizer is then added to it. All the ingredients i. e. intermediate, dissolved toughener and plasticizer, and toxic are then mixed in a manner known in the art, preferably using a roller mill or pebble mill. If desired, the plasticizer can be mixed with the rosin before combining with the phenolic #2 to form the intermediate.

As hereinbefore indicated, coatings made according to the present invention may include coloring pigments. Dyes may also be used for coloring which do not unite chemically with the resin and, in the case of hot plastic coatings, do not disturb the homogeneity of the molten mass. The following is an example of a cold coating colored with a black pigment.

EXAMPLE 42

| | Parts |
|---|---|
| Phenolic Intermediate #143 | 540 |
| Cuprous oxide | 300 |
| Tricresylphosphate | 60 |
| Chlorinated rubber | 8 |
| Coal tar naphtha | 102 |
| Lampblack | 80 |

While, as hereinbefore indicated, plasticizers and tougheners are customarily included in cold antifouling paints, satisfactory paints may be made consisting of the intermediate and toxic or the intermediate, plasticizer, and toxic. The following are examples of coatings suitable for protecting surfaces subject to seawater moving at moderate velocities wherein mechanical erosion is not appreciable.

EXAMPLE 43

| | Parts |
|---|---|
| Phenolic intermediate #143 | 54 |
| Cuprous oxide | 36 |

EXAMPLE 44

| | Parts |
|---|---|
| Phenolic intermediate #143 | 95 |
| DDT | 5 |

An example of a coating consisting of intermediate, plasticizer, and toxic follows.

EXAMPLE 45

| | Parts |
|---|---|
| Phenolic intermediate #143 | 54 |
| Tricresylphosphate | 6 |
| Cuprous oxide | 36 |

Solvents

As also hereinbefore noted, various solvents may be used with these coatings. Since the primary requirement is obviously only that the solvent be capable of dissolving the resin (polymer plus film-forming ingredient) great numbers of solvents will immediately be recognized as available by one skilled in the art. For example, in general, all common varnish and lacquer solvents can be used. The amount of solvent added beyond the minimum necessary to dissolve the various solid constituents of the coatings is not critical and can easily be varied as known in the art to facilitate brush application or spray application of the final coating. Specific illustrations which have been tried with success are listed herewith.

Hydrocarbons such as:
    Gasoline    Toluene
    Petroleum spirits    Benzene
    Dipentene    Kerosene
    Xylene Nitro substituted hydrocarbons such as:
    Nitroethane    1-nitropropane
    Nitromethane    2-nitropropane Alcohols such as:
    Ethyl alcohol    Butyl alcohol
    Methyl alcohol    Isopropyl alcohol Esters such as:
    Amyl acetate    Ethyl acetate
    Butyl acetate Ketones such as:
    Acetone
    Methyl ethyl ketone Aliphatic halogenated hydrocarbons such as:
    Methylene dichloride    Ethylene tetrachloride
    Ethylene dichloride Various combinations of solvents have also been found to be satisfactory such as 1. Acetone 70%–hexane 30%.
2. Ethylene glycol monoethyl ether 18%–turpentine 59%–mineral spirits 23%.
3. Turpentine 70%–naphtha 30%.
4. Ethylene glycol monoethyl ether 30%–turpentine 70%.

A useful variant of the phenolic intermediate made with mixed solvents is illustrated in the following example:

EXAMPLE 46
PHENOLIC INTERMEDIATE #143B

| | Parts | Composition |
|---|---|---|
| Phenolic #2 | 300 | 246 pounds. |
| Rosin | 600 | 492 pounds. |
| Coal tar naphtha | 118 | 13.3 gallons. |
| Ethyl alcohol | 31 | 3.6 gallons. |
| Secondary butyl alcohol | 31 | 3.6 gallons. |

If a toughener is used in the coating, the solvent chosen would, as is well known in the paint manufacturing art, be such in which the particular toughener would be soluble. Conversely, if, perhaps for economic reasons, a particular solvent is chosen it is necessary only to choose from the many available tougheners one which is soluble in the chosen solvent.

Plasticizers

As previously explained, many classes of materials, each involving numerous specimens, are available for use as plasticizers in protective coatings. Indeed, it has been estimated that more than 20,000 different substances are known as plasticizers. A large number of these have been found suitable for use in the cold antifouling coatings with which this invention is concerned. The following are specific examples which have proved useful.

Chemical plasticizers

1. Chlorinated diphenyl (polychlordiphenyl)
2. Hydrogenated methyl abietate
3. Butoxy ethyl stearate
4. Diethoxy ethyl phthalate
5. Dimethoxy ethyl phthalate

Chemical plasticizers—Continued

6. Methoxy ethyl oleate
7. Bis-(diethylene glycol monoethyl ether)-phthalate
8. Di-2-ethyl hexyl phthalate
9. Butyl benzene sulfonamide
10. Toluene sulfonamides (mixture ortho and para)
11. Ethyl phthalyl ethyl glycollate
12. Dibutoxy ethyl phthalate
13. Methoxy ethyl acetyl ricinoleate
14. Butyl phthalyl butyl glycollate
15. Dibutyl phthalate
16. Methyl abietate

Other plasticizers

1. Camphor
2. Cocoa butter
3. Mutton tallow
4. Acetylated castor oil
5. Pine oil
6. Bodied linseed oil
7. Raw linseed oil
8. Fractionated soybean oil fatty acids composed as follows:
   Oleic acid—30%
   Linoleic acid—56% (Neo-Fat #23)
   Linolenic acid—10%
   Saturated acids—4%
9. Alkyd resin (60% solids) Navy Dept. Spec. 52R13 (of May 1, 1944)
10. Spar varnish. Navy Dept. Spec. 52V12C of June 14, 1945
11. Soft coumarone-indene resins The amount of plasticizer used depends upon the particular plasticizer chosen. If, in a coating requiring a plasticizer, too much is used the resulting cold plastic paint will be too soft and will alligator or show flow when subjected to test on the hull of a ship moving at high speed through warm waters. On the other hand if insufficient plasticizer is incorporated, a brittle film will result that will flake or crack. The following formulation produces satisfactory coatings when the tricresylphosphate most generally used is replaced, weight for weight, by materials chosen from the preceding lists having properties similar to tricresylphosphate such as methyl abietate and chlorinated diphenyl. This formulation (Example 47) produces a paint of the type of Example 41.

EXAMPLE 47

| | Parts |
|---|---|
| Phenolic Intermediate #143 | 540 |
| Cuprous oxide | 360 |
| Plasticizer | 20–120 |
| Chlorinated rubber | 8 |
| Coal tar naphtha | 32 |

Tougheners

Tougheners for use in cold antifouling coatings are chosen from the multitude available from the classes hereinbefore mentioned with due consideration for their solubility in any particular preselected solvent. Since the toughener, in addition to making the coatings resistant to abrasion also decreases the solubility of the matrix, the amount is controlled, for any fixed ratio of toxic to matrix so that it will not decrease the solubility of the matrix below the level at which the leaching rate of the paint falls below the minimum of about 10 micrograms per square centimeter per day required for antifouling conditions. Considered from another viewpoint, if the amount of toughener is predetermined by the desired toughness of the film alone, it will be necessary to add sufficient toxic to insure an adequate minimum leaching rate. The following series of examples illustrates various formulations with different classes of tougheners.

EXAMPLE 48.—VINYL COPOLYMER

| | Parts |
|---|---|
| Phenolic Intermediate (toluene solvent) | 540 |
| Cuprous oxide | 360–720 |
| Tricresylphosphate | 60 |
| Vinylite VYHH (vinyl chloride-vinyl acetate copolymer) | 2–50 |
| Methyl ethyl ketone | 16–160 |

Vinyl polymer

EXAMPLE 49

| | Parts |
|---|---|
| Phenolic Intermediate (naphtha-ethyl alcohol-ethylene glycol monoethyl ether solvent) | 540 |
| Cuprous oxide | 360 |
| Tricresylphosphate | 60 |
| Polyvinyl butyral (Vinylite XYSG) | 2–10 |
| Ethylene glycol monoethyl ether | 19–95 |

EXAMPLE 50

| | Parts |
|---|---|
| Phenolic Intermediate #143 | 540 |
| Cuprous oxide | 360 |
| Acetylated castor oil | 60 |
| Polyvinyl butyral | 8 |
| Butyl alcohol | 89 |

Cellulosic plastics

EXAMPLE 51

| | Parts |
|---|---|
| Phenolic Intermediate #143 | 540 |
| Cuprous oxide | 360 |
| Hydrogenated methyl abietate | 60 |
| Benzyl cellulose or ethyl cellulose | 8 |
| 25% ethyl alcohol+75% xylol | 63 |

EXAMPLE 52

| | Parts |
|---|---|
| Phenolic Intermediate #143 | 540 |
| Cuprous oxide | 360 |
| Cellulose acetate propionate | 0.8–4 |
| Chlorinated diphenyl (polychlordiphenyl) | 60 |
| Acetone | 35–57 |
| Ethyl alcohol | 4–7 |

EXAMPLE 53

| | Parts |
|---|---|
| Phenolic Intermediate #143 | 540 |
| Cuprous oxide | 360 |
| Cellulose acetate butyrate | 0.8–2 |
| Chlorinated diphenyl (polychlordiphenyl) | 60 |
| Acetone | 29–35 |
| Ethyl alcohol | 3–5 |

Rubber and rubber derivatives

EXAMPLE 54

| | Parts |
|---|---|
| Phenolic Intermediate #143 | 540 |
| Cuprous oxide | 360–540 |
| Tricresylphosphate | 60 |
| Natural rubber | 0.8–4 |
| Gasoline | 20–100 |

EXAMPLE 55

| | Parts |
|---|---|
| Phenolic Intermediate #143 | 540 |
| Cuprous oxide | 360 |
| Tricresylphosphate | 60–120 |
| Chlorinated rubber | 8–25 |
| Coal tar naphtha | 32–200 |

EXAMPLE 56

| | Parts |
|---|---|
| Phenolic Intermediate #143 | 540 |
| Cuprous oxide | 360 |
| Tricresylphosphate | 60 |
| Chlorinated Buna S | 8–25 |
| Coal tar naphtha | 32–200 |

EXAMPLE 57

| | Parts |
|---|---|
| Phenolic Intermediate #143 | 540 |
| Cuprous oxide | 360 |
| Chlorinated diphenyl (polychlordiphenyl) | 60 |
| Cyclized rubber ("Pliolite") | 4–8 |
| Coal tar naphtha | 32 |

Summary of cold plastic antifouling coatings

Summarizing: the cold antifouling coatings with which this invention is concerned comprise a polymer or condensate made by reacting a phenol or mixture of phenols with an aldehyde or mixture of aldehydes in the presence of a catalyst. Preferably, phenol and formaldehyde are refluxed to the point at which formaldehyde odor disappears in the presence of lead acetate as catalyst. The mol ratio of phenol to formaldehyde may vary from 0.5 to 2 while the mol ratio of catalyst to formaldehyde may vary from 0.01–0.2. The preferred mol ratio of phenol to formaldehyde is about 1, say 0.9 to 1, and a preferred embodiment of the condensate has a mol ratio of 0.94. In the preferred embodiment the catalyst, lead acetate, is used in the ratio of 0.14 mol per mol of formaldehyde. After refluxing, the condensate is further heated to dehydrate to a temperature ranging up to 300° F., the preferred embodiment being raised to a temperature not exceeding 240° F.

The polymer or condensate is blended with a film former to produce a resin in the proportion of from 1 to 15 parts of film former for each 3 parts of polymer. A preferred resin uses a film former to polymer weight ratio of 2 and uses rosin as the film former. While some such resins may be used alone as matrices it is usually desirable to add one or more other substances, as indicated hereafter.

An intermediate may be made by adding solvent to the resin in the amount (varying from zero) of whatever is necessary to render the final coating fluid enough for the method of application contemplated. A preferred intermediate is made with about 5 parts by weight of the aforedescribed preferred resin to each part by weight of an organic solvent, or 36 pounds of resin per gallon of solvent. While some such intermediates may be used alone as vehicles, it is usually desirable to add a plasticizer and perhaps a toughener.

Usually a plasticizer is blended with the intermediate in the proportion of 27 parts of intermediate to from 1 to 6 parts of plasticizer. A preferred mixture is 27 parts of the aforedescribed preferred intermediate to 3 parts of plasticizer, preferably tricresylphosphate. Again, while some such mixtures are usable alone as vehicles it is preferably to add a toughener.

A toughener is usually added to the mixture of intermediate and plasticizer to form a vehicle of the matrix of which the toughener constitutes from 0.1% to 10%. A preferred vehicle is composed of 600 parts of the aforedescribed preferred mixture of intermediate and plasticizer combined with 8 parts of toughener, preferably chlorinated rubber, dissolved in 32 parts of organic solvent. The matrix of this vehicle is thus seen to contain about 1.5% toughener. It may be noted that since it is most convenient to blend the toughener with the remainder of the vehicle by first dissolving it in a solvent, this added amount of solvent must be considered in reckoning the ratio of solvent to matrix or the percentage of solids in the vehicle.

Considered from the viewpoint of a generalized coating composition, the proportions of ingredients in the cold antifouling coatings may be expressed as follows: for each 100 parts of the resin there are from 4 to 27 parts of plasticizer. The preferred embodiment uses 100 parts of the aforedescribed preferred resin with 13.3 parts of the preferred plasticizer, tricresylphosphate. The solvent varies from zero to about 7 gallons per 100 pounds of matrix with the preferred embodiment using about 3¼ gallons per 100 pounds of matrix.

To secure antifouling properties for the cold antifouling coatings the usual toxic is added. For example, cuprous oxide can be used in the amount of from about 0.5 to 1.5 parts for each part of matrix whereas DDT makes a suitable coating antifouling toward certain species of marine organisms in an amount of as little as about 0.07 parts for each part of matrix. A preferred embodiment uses about 0.74 part of cuprous oxide for each part of matrix.

The coatings described above, when applied in the usual thickness to a surface, exposed to sea water, maintain a constant minimum reaction with the sea water whereby the copper salt is leached out at a constant rate sufficient to prevent the permanent adherence of marine growths during at least two successive fouling seasons. The average copper-leaching rate is 12 mgs./1000 cm.$^2$/day. It is constant to within a variation of 2 mgs. on either side of the average. The minimum life of the coating, measured under way, is three to five years for each millimeter thickness of coating. The above antifouling coatings are usually applied over a suitable underwater primer coat. They prevent fouling not only when applied to ships' hulls but also when applied to the interior surface of salt water conduits.

ANTI-CORROSIVES

To protect a surface against corrosion, it is essential to exclude all moisture therefrom. This exclusion can be secured, in some cases, by applying certain metals, such as zinc, in the form of galvanizing or electro-plating. These coatings and those similar thereto are so called metallic type.

For other coatings, such as are normally achieved by paints, the exclusion of moisture is dependent on the character of the vehicle or film forming ingredients.

For these other coatings, the film, in addition to excluding moisture, must likewise be resistant to those influences (temperature changes and the action of sunlight) that tend to impair or damage the film. In other words, the durability and performance of each type of these "other" coatings is measured, primarily by its ability to exclude moisture plus its ability to withstand the effects of those other factors that impair the coating's imperviousness. Since, basically, all "other" coatings intrinsically follow the general pattern of pigment and vehicle, positive protection has, in the long run been conditioned more on the vehicle's or film forming ingredients' ability to maintain a constant intact film rather than upon any specific corrosion inhibiting power of the pigment content.

One class of such "other" coatings, known in the prior art, is the bituminous enamels, applied as hot melt paints. Experience shows that such bituminous enamels require undesirably elevated temperatures for application and even at such high temperatures exhibit high viscosities and release of gases which result in poor adhesion and porosity in the final film.

HOT MELT ANTI-CORROSIVE OR BARRIER COATINGS

The hot melt anti-corrosive or barrier coatings of this invention exhibit the propertiles of being impervious to water or moisture, resistant to those influences (temperature changes and the action of sunlight) which damage or rupture ordinary coatings and resistant to erosion. These coatings are thermoplastic, non-volatile and have, generally, low viscosity. They give complete protection against oxidation for a period at least twice as long as earlier coatings used for this purpose and do not have their undesirable application properties, such as fumes, etc.

Accordingly, they have been found to be especially useful to protect surfaces subject to intermittent action of air and water, including instances where the water flows past the surface at a relatively high rate of speed. An example of a surface subjected to extremes of these influences is found in submarine ballast tanks through which sea water flows at a very high rate as the tanks are filled or emptied for submerging or surfacing of the vessel. The hot melt anti-corrosive coatings are quite similar to the aforedescribed hot melt anti-fouling coatings with the exception that the toxic is replaced by more or less conventional pigments. They need not contain any constituents previously known in the art as anti-corrosive. The term barrier has been applied to these coatings for the reason that they act as a barrier between the surface to be protected and the sea water, air or other corrosive environment. It is apparent that coatings used for this purpose should be substantially insoluble in sea water. The hot melt barrier coatings with which this invention is concerned contain a variant of the fundamental constituent which is processed to a point at which it acquires the desired insolubility. The coatings are usually applied by spray but may be applied by brush or other means. A typical formulation for a hot melt barrier coat is described herewith.

EXAMPLE 58

| | Parts |
|---|---|
| 4A or 4B resin | 226 |
| Titanium dioxide-barium sulfate pigment ("Titanox B") | 61 |
| Magnesium silicate | 38 |
| Terphenyl ("Santowax") | 63 |
| Hydrogenated methyl abietate ("Hercolyn") | 12 |

To the molten resin at about 300° F. the titanium barium pigment is added slowly with agitation to insure good dispersion. The magnesium silicate is then added and the temperature raised to 350° F. at which time the terphenyl is added (this being a convenient temperature for melting the terphenyl) and the temperature further raised to 380° F., at which temperature the whole mixture is quite fluid, and then the hydrogenated methyl abietate is added, it being most convenient to mix the liquid plasticizer with the molten product. The temperature is then further raised to 400° F., the temperature of application of the coating, and is maintained at this temperature until foaming subsides (about five to ten minutes) in order to remove those volatile constituents that could otherwise be released and be obnoxious during the later application to the interiors of tanks, for example. The resulting product is then preferably passed through a colloid mill to insure proper mixing and is then allowed to cool and solidify to facilitate storage. Although the product may be prepared by combining the ingredients in any manner, so long as an ultimate temperature of 400° F. is reached, the sequence recited is preferred since intimate mixing of all the ingredients is most easily accomplished by that process. To prepare the coating for spray application it is simply remelted and raised to a temperature of 400° F. at which point it is of proper viscosity to spray easily. When solidified the coating is homogeneous and non-porous, adheres excellently, and is impervious to moisture. The formulation prescribes 4A or 4B resin as one of the ingredients since such resins are conveniently prepared in quantity and stored for use as a starting ingredient in the manufacture of both anti-fouling and anti-corrosive coatings. However, it is to be understood, of course, that the coating can be prepared by starting with the phenol-aldehyde reaction and proceeding continuously with the process by dehydrating to the ultimate temperature.

Although an ultimate temperature of 400° F. produces a preferred coating, a variety of satisfactory coatings can be made by varying the ultimate temperature of the condensate, and hence its degree of polymerization, from 300° F. to above 400° F. By heating the condensate alone an ultimate temperature of 500° F. is the limit for satisfactory coatings while if the condensate is first combined with a film former to make a resin and the resin is heated, the limit of the ultimate temperature is 680° F. An example of a coating made in the lower temperature range is a simple high viscosity product suitable for application by brush made by dehydrating the resin to 350° F. and blending with it a liquid plasticizer such as hydrogenated methyl abietate.

The addition of the high melting point type of plasticizer, terphenyl, to the resin in the formulation of Example 58 raises the melting point or drip point of the matrix sufficiently to render the final coating suitable for use under ordinary circumstances. For use under conditions involving unusually high ambient temperatures, the sag or drip point of the coatings may be further raised by the addition of a toughener. Such a preferred barrier coating having a raised drip point or sag point can be produced by adding a small amount of a toughener to the ingredients of Example 58. This coating is not subject to alligatoring under conditions of elevated temperature such as those encountered by the tanks of a submarine in drydock exposed to the rays of the hot summer sun. The following formulation is illustrative:

EXAMPLE 59

| | Parts |
|---|---|
| 4B resin | 358 |
| Polyvinyl butyral ("Vinylite" XYNC) | 6 |
| Titanium barium pigment | 92 |
| Magnesium silicate | 56 |
| Terphenyl ("Santowax") | 95 |
| Hydrogenated methyl abietate ("Hercolyn") | 17 |

Conveniently, although not necessarily, the polyvinyl butyral is first added to the molten resin at 300° F., then the pigments and terphenyl at 350° F., the hydrogenated methyl abietate at 380° F., and then the temperature is raised to 400° F. after which the material is preferably run through a colloid mill.

Titanium pigments, e. g., titanium dioxide, titanium barium pigment and titanium calcium pigment wet easily and give a light color which renders coatings made with these pigments useful inside tanks and the like to increase the illumination. For camouflage uses, such as on the superstructure of submarines, black paints are desirable. Two suitable formulations are given in the following examples:

EXAMPLE 60

|  | Parts |
|---|---|
| 4A or 4B resin | 296 |
| Titanium barium pigment | 80 |
| Magnesium silicate | 17 |
| Lampblack | 20 |
| Terphenyl ("Santowax") | 82 |
| Hydrogenated methyl abietate ("Hercolyn") | 15 |

EXAMPLE 61

|  | Parts |
|---|---|
| 4B resin | 373 |
| Black iron oxide pigment | 50 |
| Magnesium silicate | 100 |
| Terphenyl ("Santowax") | 99 |
| Hydrogenated methyl abietate ("Hercolyn") | 18 |
| Polyvinyl butyral ("Vinylite" XYNC) | 6 |

The preceding examples are merely illustrative since both the method of preparation and the species and proportion of constituents may vary. The barrier coatings are conveniently produced from previously prepared 4A or 4B resin but the coatings may be prepared in a continuous process beginning with the phenol aldehyde reaction. The variations indicated in the choice of phenol, aldehyde, catalyst and film forming ingredients pertaining to the manufacture of the hot melt antifouling coatings apply as well to the hot melt barrier coatings. The plasticizer may be a single substance or several substances used together. In general, the plasticizer may constitute from 5 to 60% of the matrix, depending on the particular characteristics of the plasticizer chosen. Liquid plasticizers, because their effect is more pronounced, are usually required in the amount of only 5 to 15% of the matrix. In the following formulation the plasticizers indicated have each been used separately to produce satisfactory coatings.

EXAMPLE 62

|  | Parts |
|---|---|
| 4A resin | 66.7 |
| Titanium barium pigment | 34.7 |
| Liquid plasticizer | 3.5–12 |

Liquid plasticizers:
    Ethyl toluene sulfonamide
    China-wood oil
    Oiticica oil
    Raw linseed oil
    Dehydrated castor oil
    Tricresylphosphate
    Polychlordiphenyl
    Hydrogenated methyl abietate
    Raw tung oil
    Dioctylphthalate
    Pine oil
    Butyl benzene sulfonamide
    Oleic acid
    Methyl phthalyl ethyl glycollate
    Mineral oil
    Tall oil
    Pine tar
    Coal tar
    Bodied linseed oil
    Ortho cresyl para toluene sulfonate
    Carbitol phthalate More specifically, particularly suitable coatings have been prepared with 6.6 parts of each separately of the first seven liquid plasticizers listed.

Semi-solid and solid plasticizers may be used in the amount of from 10 to 60% of the matrix. In the formulation of Example 62 these plasticizers would be substituted for the liquid plasticizer in the amount of from 7.5 to 100 parts instead of 3.5–12 parts.

Semi-solid and solid plasticizers:
    Stearic acid
    Palmitic acid
    Terphenyl
    Manganese linoleate
    Lead oleate
    Camphor
    Cocoa butter
    Lanolin
    Paraffin wax
    Micro-crystalline waxes
    Beeswax
    Carnauba wax
    Chlorinated naphthalene
    Montan wax
    Ceresin wax
    Mutton tallow

*Summary of hot anti-corrosive coatings*

Recapitulating, it is seen that all the varieties of resins available for use in the aforedescribed hot plastic antifouling coatings are also available for use in the hot anti-corrosive coatings, the ultimate temperature of dehydration of the resin ranging as high as 680° F.

On the basis of 100 parts of resin, 11 to 150 parts of plasticizer are used. The preferred embodiments use about 31 parts of plasticizer for each 100 parts of resin. In the preferred embodiments a toughener is used in the amount of about 1.2% of the matrix. The pigment may vary from zero to 14% by volume of the total composition of the applied coating. The barrier coatings are generally applied by spraying or brushing in a thickness of about 4 to 6 millimeters and preferably over a primer coat.

COLD ANTI-CORROSIVE OR PRIMER COATINGS

Cold anti-corrosive or primer coatings are usually applied directly to the surface to be protected, which surface may be metal, wood or other composition. The purpose of the primer coating is to provide a layer which will adhere satisfactorily to the surface and to which a successive coating will satisfactorily adhere. Where the cold anti-corrosive coating is applied as a primer to a metal surface subjected to fouling, it also serves as a barrier between the metal surface and the antifouling coating. This is desirable since antifouling coatings frequently contain ingredients which are corrosive to steel. The cold anti-corrosive or primer coatings with which this invention is concerned contain variants of the same fundamental constituent common to the other coatings hereinbefore described. This constituent imparts to the coating the property of imperviousness to water. Preferably the coating comprises the 4B resin, plasticizers, pigments, and sufficient solvent to make a relatively very fluid product which will penetrate all the minute irregularities of the surface to be protected. In general, all the constituents with the exception of the resin have previously been used in anti-corrosive paints but the substitution of the 4B resin for the prior art resins renders these coatings truly anti-corrosive whereas the former coatings, usually using natural resins, deteriorated in a relatively short time. Following are examples of such coatings.

EXAMPLE 63

| | Parts |
|---|---|
| 4B resin | 314 |
| Coal tar naphtha | 314 |
| Coal tar | 37 |
| Any one of manganese linoleate, lead linoleate, linseed oil fatty acids, lead oleate | 103 |
| Zinc oxide | 184 |
| Chrome yellow | 92 |
| Silica | 92 |

Other variations using 4B resin have been formulated as follows:

EXAMPLE 64

| | Parts |
|---|---|
| 4B resin | 314 |
| Coal tar naphtha | 314 |
| Polychlordiphenyl (Aroclor 1248) | 37 |
| Lead linoleate | 103 |
| Zinc oxide | 184 |
| Chrome yellow | 92 |
| Silica | 92 |

EXAMPLE 65

| | Parts |
|---|---|
| 4B resin | 145 |
| Coal tar naphtha | 380 |
| Coal tar | 47 |
| Manganese linoleate | 129 |
| Zinc oxide | 186 |
| Venetian red | 93 |
| Silica | 93 |

EXAMPLE 66

| | Parts |
|---|---|
| 4B resin | 314 |
| Petroleum xylol | 275 |
| Tricresylphosphate | 20 |
| Linseed oil fatty acids | 75 |
| Red lead | 184 |
| Zinc chromate | 92 |
| Magnesium silicate | 92 |

Although the foregoing examples specify 4B resin, it should be understood that all the variations in the choice and range of phenols, aldehydes, catalysts, film forming ingredients, plasticizers, tougheners, etc. described in reference to the cold antifouling coatings apply as well to the cold anti-corrosive coatings.

The invention described herein may be manufactured and used by or for the Government of the United States of America for governmental purposes without the payment of any royalties thereon or therefor.

We claim:

1. An antifouling composition comprising 116 parts of cuprous oxide and a matrix, said matrix being produced by intimately mixing 99 parts of paraffin with 163 parts of a resin, said resin being produced by blending 108 parts of a polymer with 360 parts of resin and partially polymerizing and dehydrating the blend at elevated temperature, the temperature of dehydration rising to about 300° F., said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.04 mol for each mol of formaldehyde.

2. An antifouling composition comprising 116 parts of cuprous oxide and a matrix, said matrix being produced by intimately mixing 99 parts of paraffin with 163 parts of a resin, said resin being produced by blending 108 parts of a polymer with 360 parts of rosin, the temperature of at least the polymer having been elevated to from 275° F. to 325° F. to partially polymerize and dehydrate the same, the temperature of said polymer never exceeding 325° F. during the entire process, said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.04 mol for each mol of formaldehyde.

3. An antifouling composition comprising an antifouling toxic and a matrix, said matrix being produced by intimately mixing 5 to 70 parts of a plasticizer with 100 parts of a resin, said resin being produced by blending 128 parts of a polymer with 360 parts of rosin, the temperature of at least the polymer having been elevated to from 275° F. to 325° F. to partially polymerize and dehydrate the same, the temperature of said polymer never exceeding 325° F. during the entire process, said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.14 mol for each mol of formaldehyde.

4. An antifouling composition comprising an antifouling toxic and a matrix, said matrix being produced by intimately mixing 5 to 70 parts of a plasticizer with 100 parts of a resin, said resin being produced by blending 108 parts of a polymer with 360 parts of rosin, the temperature of at least the polymer having been elevated to from 275° F. to 325° F. to partially polymerize and dehydrate the same, the temperature of said polymer never exceeding 325° F. during the entire process, said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.04 mol for each mol of formaldehyde.

5. An antifouling composition comprising 1 part of a matrix and from 0.4 to 3 parts of an antifouling toxic, said matrix being formed by intimately mixing 5 to 70 parts of a plasticizer with 100 parts of a resin, said resin being produced by blending with 360 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, from 108 to 128 parts of polymer formed by reacting to the point at which the formaldehyde odor disappears, an aqueous mixture containing phenol and formaldehyde, the mol ratio of phenol to formaldehyde being 1¼, and from 0.04 to 0.14 mol of lead acetate as catalyst and buffer for each mol of formaldehyde, the temperature of at least the polymer having been elevated to from 275° F. to 325° F. to partially polymerize and dehydrate the same, the temperature of the polymer never exceeding 325° F. during the entire process.

6. An antifouling composition comprising an antifouling toxic and a matrix, said matrix being produced by intimately mixing 5 to 70 parts of a plasticizer with 100 parts of a resin, said resin being produced by blending with 360 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, from 108 to 128 parts of polymer formed by reacting to the point at which the formaldehyde odor disappears, an aqueous mixture containing phenol and formaldehyde, the mol ratio of phenol to formaldehyde being 1¼, and from 0.04 to 0.14 mol of lead acetate as catalyst and buffer for each mol of formaldehyde, the temperature of at least the polymer having been elevated to from 275° F. to 325° F. to partially polymerize and dehydrate the same, the temperature of the polymer never exceeding 325° F. during the entire process.

7. An antifouling composition comprising from 0.4 to 3 parts of an antifouling toxic and 1 part of a matrix, said matrix being produced by intimately mixing from 5 to 70 parts of a plasticizer with 100 parts of a resin, said resin being produced by blending 1 part of a polymer with from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting to the point at which the formaldehyde odor disappears, an aqueous mixture containing phenol and formaldehyde, the mol ratio of phenol to formaldehyde being 1¼, and from 0.04 to 0.14 mol of lead acetate as catalyst and buffer for each mol of formaldehyde, the temperature of at least the polymer having been elevated to from 275° F. to 325° F. to partially polymerize and dehydrate the same, the temperature of the polymer never exceeding 325° F. during the entire process.

8. An antifouling composition comprising an antifouling toxic and a matrix, said matrix being produced by intimately mixing from 5 to 70 parts of a plasticizer with 100 parts of a resin, said resin being produced by blending 1 part of a polymer with from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting to the point at which the formaldehyde odor disappears, an aqueous mixture containing phenol and formaldehyde, the mol ratio of phenol to formaldehyde being 1¼, and from 0.04 to 0.14 mol of lead acetate as catalyst and buffer for each mol of formaldehyde, the temperature of at least the polymer having been elevated to from 275° F. to 325° F. to partially polymerize and dehydrate the same, the temperature of the polymer never exceeding 325° F. during the entire process.

9. An antifouling composition comprising an antifouling toxic and a matrix, said matrix being formed by intimately mixing a thermoplastic high polymer toughener, from 5 to 70 parts of a plasticizer and 100 parts of a resin, said toughener constituting from 0.5% to 13% of said matrix, said resin being produced by blending with 1 part of a polymer from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of the polymer never exceeding 325° F. during the entire process, said polymer being formed by reacting, to the point at which the formaldehyde odor disappears, an aqueous mixture containing phenol and formaldehyde, the mol ratio of phenol to formaldehyde lying within the range of 2.5 to 1 and from 0.01 to 0.2 mol of lead acetate as catalyst and buffer per mol of formaldehyde.

10. An antifouling composition comprising an antifouling toxic and a matrix, said matrix being produced by intimately mixing a thermoplastic high polymer toughener, from 5 to 70 parts of a plasticizer and 100 parts of a resin, said resin being produced by blending with 1 part of a polymer from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of the polymer never exceeding 325° F. during the entire process, said polymer being formed by reacting, to the point at which the formaldehyde odor disappears, an aqueous mixture containing phenol and formaldehyde, the mol ratio of phenol to formaldehyde lying within the range of 2.5 to 1 and from 0.01 to 0.2 mol of lead acetate as catalyst and buffer per mol of formaldehyde.

11. An antifouling composition comprising an antifouling toxic and a matrix, said matrix being formed by intimately mixing 5 to 70 parts of a plasticizer with 100 parts of a resin, said resin being produced by blending 1 part of a polymer with from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of the polymer never exceeding 325° F. during the entire process, said polymer being formed by reacting, to the point at which the aldehyde odor disappears, an aqueous mixture containing a monohydric phenolic constituent and a monoaldehyde constituent, the mol ratio of the phenolic constituent to the aldehyde constituent lying within the range of 2.5 to 1, and a metallic-compound catalyst and buffer for the phenol-aldehyde reaction selected from the group consisting of lead acetate, cupric acetate, litharge, and lead salicylate in the amount at least 0.01 mol per mol of aldehyde constituent.

12. An antifouling composition comprising an antifouling toxic and a matrix, said matrix being produced by intimately mixing a thermoplastic high polymer toughener from 5 to 70 parts of a plasticizer and 100 parts of a resin, said toughener constituting from 0.5% to 13% of the matrix, and said resin being produced by blending 1 part of a polymer with from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of the polymer never exceeding 325° F. during the entire process, said polymer being formed by reacting, to the point at which the aldehyde odor disappears, an aqueous mixture containing a monohydric phenolic constituent and a monoaldehyde constituent, the mol ratio of the phenolic constituent to the aldehyde constituent lying within the range of 2.5 to 1, and a metallic-compound catalyst and buffer for the phenol-aldehyde reaction selected from the group consisting of lead acetate, cupric acetate, litharge, and lead salicylate in the amount of at least 0.01 mol per mol of aldehyde constituent.

13. An antifouling composition comprising an antifouling toxic and a matrix, said matrix being produced by intimately mixing 5 to 70 parts of a plasticizer with 100 parts of a resin, said resin being produced by blending 1 part of a polymer with from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of said polymer never exceeding 325° F. during the entire process, said polymer having been formed by reacting to the point at which the aldehyde odor disappears, an aqueous mixture containing a monohydric phenolic constituent and a monoaldehyde constituent, the mol ratio of the phenolic constituent to the aldehyde constituent lying within the range of 2.5 to 1 and from 0.01 to 0.2 mol of lead acetate as catalyst and buffer per mol of aldehyde constituent.

14. An antifouling composition comprising an antifouling toxic and a matrix, said matrix being produced by intimately mixing 5 to 70 parts of a plasticizer with 100 parts of a resin, said resin being produced by blending with 1 part of a polymer from 1.5 to 7 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, the temperature of at least the polymer having been elevated to from 275° F. to 325° F. to partially polymerize and dehydrate the same, the temperature of the polymer never exceeding 325° F. during the entire process, said polymer being formed by reacting, to the point at which the formaldehyde odor disappears, an aqueous mixture containing phenol and formaldehyde, the mol ratio of phenol to formaldehyde lying within the range of 2.5 to 1 and from 0.01 to 0.2 mol of lead acetate as catalyst and buffer per mol of formaldehyde.

15. An antifouling composition comprising 116 parts of cuprous oxide, and a matrix, said matrix being produced by intimately mixing 99 parts of paraffin with 163 parts of a resin, said resin being produced by blending 128 parts of a polymer with 360 parts of rosin and partially polymerizing and dehydrating the blend at elevated temperature, the temperature of dehydration rising to about 300° F., the temperature of said polymer never exceeding about 300° F. during the entire process, said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.14 mol for each mol of formaldehyde.

16. An antifouling composition comprising 116 parts of cuprous oxide and a matrix, said matrix being produced by intimately mixing 99 parts of paraffin with 163 parts of a resin, said resin being produced by blending 128 parts of a polymer with 360 parts of rosin, the temperature of at least the polymer having been elevated to from 275° F. to 325° F. to partially polymerize and dehydrate the same, the temperature of said polymer never exceeding 325° F. during the entire process, said polymer being formed by reacting, to the point at which the formaldehyde odor disappears, an aqueous mixture containing phenol and formaldehyde, the mol ratio of phenol to formaldehyde being 1¼ and lead acetate as catalyst and buffer in the amount of about 0.14 mols for each mol of formaldehyde.

17. An antifouling composition comprising an antifouling toxic and a vehicle, said vehicle comprising a solvent and a matrix combined in the proportions of about 3¼ gallons of solvent per each 100 pounds of matrix, said matrix comprising 450 parts of a resin, 60 parts of tricresylphosphate, and 8 parts of chlorinated rubber, said toxic being cuprous oxide in the amount of about 0.74 part for each part of the matrix, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of about 0.14 mol for each mol of formaldehyde, and thereafter partially polymerizing further and dehydrating the polymer to a temperature of about 225° F., the temperature of the polymer never exceeding 240° F. during the entire process.

18. An antifouling composition comprising an antifouling toxic and a vehicle, said vehicle comprising a solvent and a matrix combined in the proportions of about 3¼ gallons of solvent per each 100 pounds of matrix, said matrix comprising 450 parts of a resin, 60 parts of tricresylphosphate, and 8 parts of chlorinated rubber, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of about 0.14 mol for each mol of formaldehyde, and thereafter partially polymerizing further and dehydrating the polymer to a temperature of about 225° F. the temperature of the polymer never exceeding 240° F. during the entire process.

19. An antifouling composition comprising an antifouling toxic and a vehicle, said vehicle comprising a solvent and a matrix combined in the proportions of about 3¼ gallons of solvent per each 100 pounds of matrix, said matrix comprising 450 parts of a resin, 60 parts of tricresylphosphate, and 8 parts of chlorinated rubber, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of about 0.14 mol for each mol of formaldehyde, and thereafter partially polymerizing further and dehydrating the polymer at an elevated temperature, the temperature of the polymer during the entire process never exceeding 300° F.

20. An antifouling composition comprising an antifouling toxic and a resin, said resin being produced by blending 3 parts of a polymer with from 1 to 15 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of from 0.01 to 0.2 mol per mol of formaldehyde, and thereafter partially polymerizing further and dehydrating the polymer at an elevated temperature, the temperature of the polymer during the entire process never exceeding 300° F.

21. An antifouling composition comprising an antifouling toxic and a vehicle, said vehicle comprising a solvent and a matrix combined in the proportions of about 3¼ gallons of solvent per each 100 pounds of matrix, said matrix comprising 450 parts of a resin, 60 parts of tricresylphosphate, and 8 parts of chlorinated rubber, said toxic being cuprous oxide in the amount of about 0.74 part for each part of matrix, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1 and lead acetate as catalyst and buffer in the amount of about 0.04 mol for each mol of formaldehyde, and thereafter partially polymerizing further and dehydrating the polymer to a temperature of about 225° F., the temperature of the polymer never exceeding 240° F. during the entire process.

22. An antifouling composition comprising an antifouling toxic and a vehicle, said vehicle comprising a solvent and a matrix combined in the proportions of about 3¼ gallons of solvent per each 100 pounds of matrix, said matrix comprising 450 parts of a resin, 60 parts of tricresylphosphate, and 8 parts of chlorinated rubber, said toxic being cuprous oxide in the amount of about 0.74 part for each part of matrix, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1 and lead acetate as catalyst and buffer in the amount of about 0.04 mol for each mol of formaldehyde and thereafter partially polymerizing further and dehydrating the polymer at an elevated temperature, the temperature of the polymer during the entire process never exceeding 300° F.

23. An antifouling composition comprising an antifouling toxic, and a vehicle, said vehicle comprising a matrix, and an amount of solvent sufficient to endow the coating with the fluidity necessary for facile application, said matrix comprising from 4 to 27 parts of a plasticizer with each 100 parts of a resin, said resin being produced by blending 1 part of a polymer with 2 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of from 0.01 to 0.2 mol per mol of formaldehyde, and thereafter partially polymerizing further and dehydrating the polymer at an elevated temperature, the temperature of the polymer during the entire process never exceeding 300° F.

24. An antifouling composition comprising an antifouling toxic, and a vehicle, said vehicle comprising a matrix and an amount of solvent sufficient to endow the coating with the fluidity necessary for facile application, said matrix comprising from 4 to 27 parts of a plasticizer with each 100 parts of a resin, said resin being produced by blending 3 parts of a polymer with from 1 to 15 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of from 0.01 to 0.2 mol per mol of formaldehyde, and thereafter partially polymerizing further and dehydrating the polymer at an elevated temperature, the temperature of the polymer during the entire process never exceeding 300° F.

25. An antifouling composition comprising an antifouling toxic and a vehicle, said vehicle comprising a solvent and a matrix combined in the proportions of about 3¼ gallons of solvent per 100 pounds of matrix, said matrix comprising a toughener, 450 parts of a resin, and 60 parts of tricresylphosphate, said toughener constituting from 0.1% to 10% by weight of said matrix, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of about 0.14 mol for each mol of formaldehyde, and thereafter partially polymerizing further and dehydrating the polymer to a temperature of about 225° F., the temperature of the polymer never exceeding 240° F. during the entire process.

26. An antifouling composition comprising an antifouling toxic and a vehicle, said vehicle comprising a solvent and a matrix combined in the proportions of about 3¼ gallons of solvent per 100 pounds of matrix, said matrix comprising a toughener, 450 parts of a resin, and 60 parts of tricresylphosphate, said toughener constituting from 0.1% to 10% by weight of said matrix, said resin being produced by blending 1 part of a polymer with 2 parts of rosin, said polymer being formed by reacting, to the point at which the formaldehyde odor disappears, an aqueous mixture containing phenol and formaldehyde, the mol ratio of phenol to formaldehyde being about 1, and lead acetate as catalyst and buffer in the amount of about 0.14 mol for each mol of formaldehyde, and thereafter partially polymerizing further and dehydrating the polymer at an elevated temperature, the temperature of the polymer during the entire process never exceeding 300° F.

27. An antifouling composition comprising an antifouling toxic, and a vehicle, said vehicle comprising a matrix and an amount of solvent sufficient to endow the coating with the fluidity necessary for facile application, said matrix comprising from 4 to 27 parts of a plasticizer with each 100 parts of a resin, said resin beng produced by blending 3 parts of a polymer with from 1 to 15 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the formaldehyde odor disappears, an aqueous mixture containing phenol and formaldehyde, the mol ratio of phenol to formaldehyde lying within the range of 0.5 to 2, and lead acetate as catalyst and buffer in the amount of 0.01 to 0.2 mol per mol of formaldehyde, and thereafter partially polymerizing further and dehydrating the polymer at an elevated temperature, the temperature of the polymer during the entire process never exceeding 300° F.

28. An antifouling composition comprising an antifouling toxic and a vehicle, said vehicle comprising a matrix and an amount of solvent sufficient to endow the coating with the fluidity necessary for facile application, said matrix comprising from 4 to 27 parts of a plasticizer with each 100 parts of a resin, said resin being produced by blending 3 parts of a polymer with from 1 to 15 parts of film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the formaldehyde odor disappears, an aqueous mixture containing phenol and formaldehyde, the mol ratio of phenol to formaldehyde lying within the range of 0.5 to 2, and for each mol of formaldehyde from 0.01 to 0.2 mols of a metallic-compound catalyst and buffer selected from the group consisting of lead acetate, cupric acetate, litharge, and lead salicylate, and thereafter partially polymerizing further and dehydrating the polymer at an elevated temperature, the temperature of the polymer never exceeding 300° F.

29. An antifouling composition comprising an antifouling toxic, and a vehicle, said vehicle comprising a matrix and an amount of solvent sufficient to endow the coating with the fluidity necessary for facile application, said matrix comprising from 4 to 27 parts of a plasticizer with each 100 parts of a resin, said resin being produced by blending 3 parts of a polymer with 1 to 15 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the aldehyde odor disappears, an aqueous mixture containing a monohydric phenolic constituent, a monoaldehyde constituent, the mol ratio of the phenolic constituent to the aldehyde constituent, the mol ratio of the phenolic constituent to the aldehyde constituent lying within the range of 0.5 to 2, and lead acetate as catalyst and buffer in the amount of 0.01 to 0.2 mol per mol of aldehyde constituent, and thereafter partially polymerizing further and dehydrating the polymer at an elevated temperature, the temperature of the polymer during the entire process never exceeding 300° F.

30. An antifouling composition comprising an antifouling toxic, and a vehicle, said vehicle comprising a matrix and an amount of solvent sufficient to endow the coating with the fluidity necessary for facile application, said matrix comprising from 4 to 27 parts of a plasticizer with each 100 parts of a resin, said resin being produced by blending 3 parts of a polymer with 1 to 15 parts of a film former selected from the group consisting of rosin, yacca gum, hydrogenated rosin, abietic acid, the resinous adduct of maleic anhydride and a monocyclic terpene possessing the p-cymene skeleton, and mixtures thereof, said polymer being formed by reacting, to the point at which the aldehyde odor disappears, an aqueous mixture containing a monohydric phenolic constituent, a monoaldehyde constituent, the mol ratio of the phenolic constituent to the aldehyde constituent lying within the range of 0.5 to 2, and a metallic-compound catalyst and buffer, in the amount of 0.01 to 0.2 mol per mol of formaldehyde, selected from the group consisting of lead acetate, cupric acetate, litharge, and lead salicylate, and thereafter partially polymerizing further and dehydrating the polymer at an elevated temperature, the temperature of the polymer during the entire process never exceeding 300° F.

ANTONIO S. PITRE.
JOHN RUDOLPH SAROYAN.

REFERENCES CITED

The following references are of record in the file of this patent:

UNITED STATES PATENTS

| Number | Name | Date |
|---|---|---|
| 1,808,716 | Rosenblum | June 2, 1931 |
| 2,121,642 | Rosenblum | June 21, 1938 |
| 2,169,361 | Kohn | Aug. 15, 1939 |
| 2,489,228 | Rudd | Nov. 22, 1949 |

FOREIGN PATENTS

| Number | Country | Date |
|---|---|---|
| 442,211 | Germany | Mar. 24, 1927 |
| 492,731 | Great Britain | of 1938 |
| 887,921 | France | Aug. 23, 1943 |

OTHER REFERENCES

Baekeland Ind. & Eng. Chem., August 1909, pages 545–549.

Ind. & Eng. Chem., Ketchum et al., September 1946, pages 931–936.